US012401181B2

(12) United States Patent
Gong et al.

(10) Patent No.: US 12,401,181 B2
(45) Date of Patent: Aug. 26, 2025

(54) FENESTRATION UNIT HAVING INTEGRATED POWER INTERFACE FOR PERIPHERAL DEVICES (71) Applicant: JELD-WEN, Inc., Charlotte, NC (US)

(72) Inventors: Yuxuan Gong, Lewis Center, OH (US); Qingzheng Cheng, Charlotte, NC (US); Paul Hemingfield, Charlotte, NC (US); Neal Hambleton, Huntersville, NC (US)

(73) Assignee: JELD-WEN, Inc.

( * ) Notice: Subject to any disclaimer, the term of this patent is extended or adjusted under 35 U.S.C. 154(b) by 240 days.

(21) Appl. No.: 18/051,928

(22) Filed: Nov. 2, 2022

(65) Prior Publication Data
US 2024/0146046 A1  May 2, 2024

(51) Int. Cl.
E06B 7/28 (2006.01)
H02G 3/22 (2006.01)
H02J 7/35 (2006.01)

(52) U.S. Cl.
CPC ............. H02G 3/22 (2013.01); E06B 7/28 (2013.01); H02J 7/35 (2013.01)

(58) Field of Classification Search
CPC ..... E06B 7/28; E06B 2009/2476; H02G 3/22; H02S 20/26; A47B 2220/0091; A47B 2220/0094
See application file for complete search history.

(56) References Cited

U.S. PATENT DOCUMENTS

| | | | | |
|---|---|---|---|---|
| 5,135,413 A | * | 8/1992 | Pannizzo | H01R 13/73 49/55 |
| 5,212,907 A | * | 5/1993 | Van Sandt | H02G 11/00 439/31 |
| 6,227,388 B1 | * | 5/2001 | Borzelleca | F21V 21/34 362/393 |
| 6,891,479 B1 | * | 5/2005 | Eccleston | E05F 15/63 340/545.1 |
| 9,328,906 B1 | * | 5/2016 | Bennington | F21V 23/04 |
| 9,837,568 B1 | * | 12/2017 | Frimpong | H02S 20/30 |
| 9,953,496 B2 | * | 4/2018 | Westman | G08B 13/08 |

(Continued)

FOREIGN PATENT DOCUMENTS

CN  210901770 U  *  7/2020
WO  2009110893 A1     9/2009

(Continued)

OTHER PUBLICATIONS

Machine Translation of CN-210901770-U (Year: 2020).*

Primary Examiner — Ryan D Kwiecinski
(74) Attorney, Agent, or Firm — Ingrassia Fisher & Lorenz, LLP (57) ABSTRACT A fenestration unit for a dwelling is disclosed. The fenestration unit, in the form of a window unit or a door unit includes a frame supporting a movable panel. A power supply module includes a battery pack disposed in one of the frame and the moveable panel. A power outlet module is also mounted in one of the frame and the movable panel. The power outlet module has a power outlet connector electrically coupled to the battery pack and is configured to resist water penetration therein. A homeowner device may be electrically coupled to the power outlet connector such that the power supply module powers the homeowner device.

17 Claims, 5 Drawing Sheets

(56) References Cited

U.S. PATENT DOCUMENTS

| | | | |
|---|---|---|---|
| 10,017,963 | B2 | 7/2018 | Johnson et al. |
| 10,027,503 | B2* | 7/2018 | Patrick ............. H04N 21/43637 |
| 10,580,333 | B2* | 3/2020 | Artwohl ................. A47F 3/001 |
| 10,813,196 | B1* | 10/2020 | Stubbs .................. H05B 47/11 |
| 2005/0166495 | A1* | 8/2005 | Cho ........................ E06B 7/12 |
| | | | 52/204.5 |
| 2005/0183833 | A1* | 8/2005 | Vasquez ................ E06B 7/096 |
| | | | 160/133 |
| 2008/0250717 | A1* | 10/2008 | Vasquez .................. E06B 9/68 |
| | | | 49/506 |
| 2012/0031664 | A1* | 2/2012 | Nixon-Lane ............ H02G 3/22 |
| | | | 439/502 |
| 2012/0320560 | A1* | 12/2012 | Van Der Poel .......... E06B 9/32 |
| | | | 362/1 |
| 2013/0036672 | A1* | 2/2013 | Westerfield ............. E06B 7/32 |
| | | | 49/506 |
| 2014/0020312 | A1* | 1/2014 | Seiling .................... E06B 7/28 |
| | | | 52/173.3 |
| 2014/0116497 | A1* | 5/2014 | Sanders ................. H02S 40/32 |
| | | | 136/246 |
| 2015/0159401 | A1* | 6/2015 | Patrick ................. H04N 21/422 |
| | | | 292/137 |
| 2015/0325946 | A1* | 11/2015 | Savage ............. H01R 13/5227 |
| | | | 439/142 |
| 2017/0358952 | A1 | 12/2017 | Butler et al. |
| 2018/0159283 | A1* | 6/2018 | Garcia .................. H01R 25/006 |
| 2019/0221144 | A1* | 7/2019 | Artwohl ................ A47F 3/0434 |
| 2019/0252565 | A1* | 8/2019 | Lyons ..................... H02S 20/22 |
| 2019/0277059 | A1* | 9/2019 | Robertson ........... E05B 47/0004 |
| 2020/0043271 | A1* | 2/2020 | Anderson .............. H04N 23/54 |
| 2020/0321908 | A1* | 10/2020 | Anders .................. H02J 3/381 |
| 2020/0347669 | A1* | 11/2020 | Nickerson ................ E06B 7/32 |
| 2020/0395885 | A1* | 12/2020 | Janowski .................. E06B 3/36 |
| 2021/0404218 | A1 | 12/2021 | Meyer |
| 2022/0417630 | A1* | 12/2022 | Beltran .................. H03F 3/183 |
| 2023/0010220 | A1* | 1/2023 | Nitidharmatut ..... E05D 11/0081 |
| 2023/0066465 | A1* | 3/2023 | Cronin ...................... E06B 9/24 |
| 2023/0288771 | A1* | 9/2023 | Frank ..................... H01H 15/04 |
| 2023/0295983 | A1* | 9/2023 | Cronin ..................... E06B 3/70 |
| | | | 359/237 |
| 2023/0374851 | A1* | 11/2023 | Wexler .................... E06B 3/285 |
| 2024/0060358 | A1* | 2/2024 | Staton ................. E05D 13/1276 |
| 2024/0146046 | A1* | 5/2024 | Gong ......................... E06B 7/28 |
| 2024/0195232 | A1* | 6/2024 | Bodurka ................. H02J 50/10 |
| 2024/0242717 | A1* | 7/2024 | Makker ................. G06F 3/013 |
| 2024/0250562 | A1* | 7/2024 | Bodurka ................... E06B 3/00 |

FOREIGN PATENT DOCUMENTS

| | | |
|---|---|---|
| WO | 2012013589 A2 | 2/2012 |
| WO | 2020122871 A1 | 6/2020 |

* cited by examiner

FENESTRATION UNIT HAVING INTEGRATED POWER INTERFACE FOR PERIPHERAL DEVICES

TECHNICAL FIELD OF THE INVENTION

The present disclosure relates to fenestration units and more particularly to fenestration units configured with power inlet modules, power outlet modules and ancillary components including peripheral devices for the fenestration unit.

BACKGROUND OF THE INVENTION

This section provides background information related to the present disclosure which is not necessarily prior art.

Significant advances have been made in the area of home computing networks over the past decade. As a result there has been a proliferation of peripheral devices for automating functions associated with buildings and in particular dwellings. Such devices include lights, power outlets, thermostats, and window shades, as well as a variety of appliances and electronics. Such device may also include various sensors—light sensors, motion sensor, temperature sensors, and the like—for measuring environmental condition that may be used in more sophisticated home automation systems. It should be appreciated that many of these types of devices may be located on or near a fenestration unit.

While many of these devices connect wirelessly to the home computing network, they often require an external power source for operating the device and/or charging batteries of the device. The external power source may be hardwired to the device or alternately connected to a conventional electrical outlet via a transformer block with a standardized cable such as a USB cable. In either case, powering these devices can require a significant investment in time and/or money to hardwiring them or can create unsightly wiring running from the nearest electrical outlet to the device.

Accordingly, there is a need in the art of fenestration units to provide an integrated interface for powering such peripheral devices.

SUMMARY OF THE INVENTION

This section provides a general summary of the disclosure and is not a comprehensive disclosure of its full scope or all of its features.

The present disclosure is for a fenestration unit with a built-in battery and a power outlet module operable to power homeowner devices that may include security cameras, flood lights, interior or exterior sensors of a dwelling, or other similar devices of homeowner's needs. The fenestration unit includes an in-situ power supply module and a power outlet module. The power supply module may be permanently installed in the fenestration unit or alternately may be removably disposed in the fenestration unit. The power outlet module may include a standardized output jack that is accessible on the interior or the exterior of the fenestration unit. When accessible on the exterior of the fenestration unit, the power outlet module has weather-resistant features to ensure proper operation and durability of the module. Such weather-resistant features may include a silicone enclosure (i.e., cap and/or wire connectors) for the output jack and/or a downwardly-angled orientation of the output jack for preventing water intrusion (e.g., IPX4) and permitting drainage if water or water vapor built-up occurs.

The power supply module specifications may be configured according to the power requirements and specifications for the desired applications and the device(s) to be operated. The power supply module may be a re-chargeable power supply module that can be re-charge using external or internal power sources. An external power source may include home electrical power outlet. In the case of external power, the power supply module may include a power inlet module having a standardized input jack that is accessible on the interior of the fenestration unit and a power transformer configure to convert the source power (e.g., 110-120 VAC in the US) to a power compatible for the battery. An internal power source may include solar power generated using transparent photovoltaic glass (e.g. perovskite solar cell; organic solar cells) or other types of solar cell integrated into the non-glass structure of a fenestration unit. In the case of solar power, the power supply module may include a power conditioning module configure to condition the solar-generated power to a power compatible for the battery.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
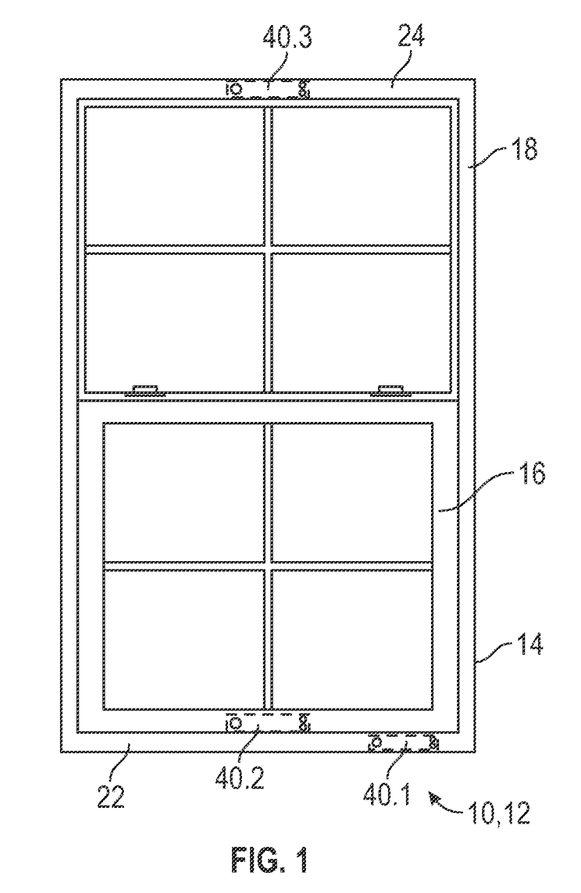
FIG. 1 shows an interior side of a window in accordance with the present disclosure.
Figure 2:
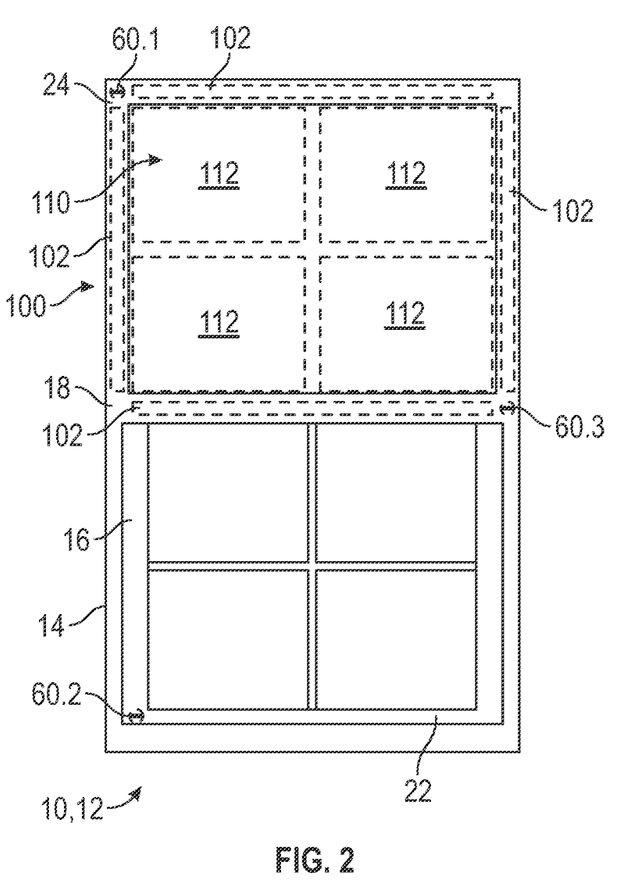
FIG. 2 shows an exterior side of the window shown in FIG. 1.

With reference to the figures, a fenestration unit 10 with a built-in power supply module 40 and a power outlet module 60 operable to power a homeowner device 80. With particular reference to FIGS. 1 and 2, the fenestration unit 10 is in the form of a double hung window unit 12. One skilled in the art should understand that the double hung window unit 12 represents an exemplary embodiment and that the present disclosure contemplates other types of window units including but not limited to single hung, casement, awning, hooper, sliding, or fixed glass units, adapted with a built-in power supply module and a power outlet module in a manner similar to that described herein. The double hung window unit 12 includes a window frame 14 slidably supporting a lower sash 16 and an upper sash 18.

FIG. 1 shows the interior side of the window unit 12 having one or more power supply modules 40.1, 40.2, 40.3 built into a component for the window unit 12. For illustrative purposes, power supply module 40.1 is shown built into the window frame 14, power supply module 40.2 is shown built into a lower sash rail 22 and power supply module 40.3 is shown built into an upper sash rail 24. While multiple power supply modules are illustrated, one such unit may be sufficient for a given application. One skilled in the art should understand that a power supply module may built into other locations on the window unit 10. These power supply module 40.1, 40.2, 40.3 may be singularly or collectively referenced herein as a power supply module 40.

FIG. 2 shows the exterior side of the window unit 12 having one or more power outlet modules 60 built into a component of the window unit 10. For illustrative purposes, power outlet module 60.1 is shown built into the window frame 14, power outlet module 60.2 is shown built into the lower sash rail 22, and power outlet module 60.3 is shown built into the upper sash rail 24. While multiple power outlet modules are illustrated, one such unit may be sufficient for a given application. One skilled in the art should understand that a power outlet module may built into other locations on the window unit 12. These power outlet modules 60.1, 60.2, 60.3 may be singularly or collectively referenced herein as a power outlet module 60.

Figure 3:
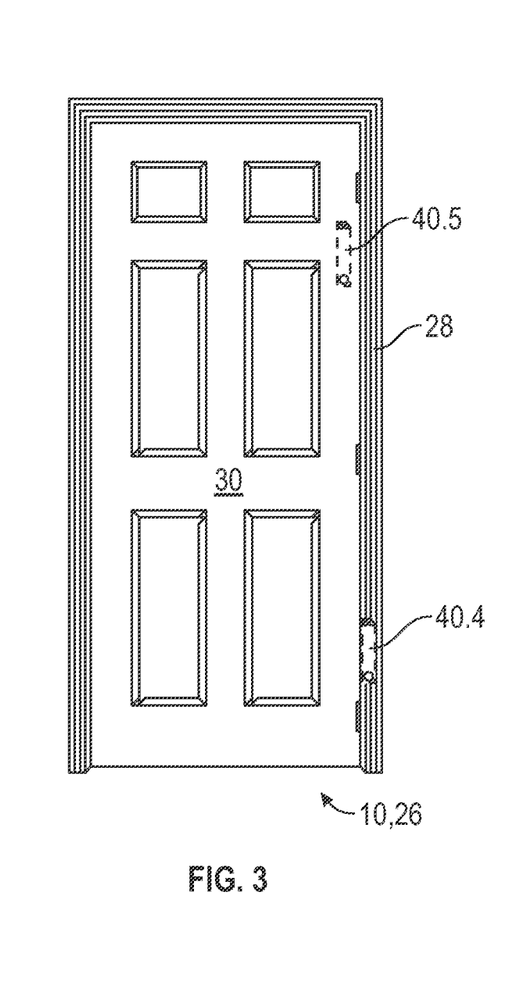
FIG. 3 shows an interior side of a door in accordance with the present disclosure.
Figure 4:
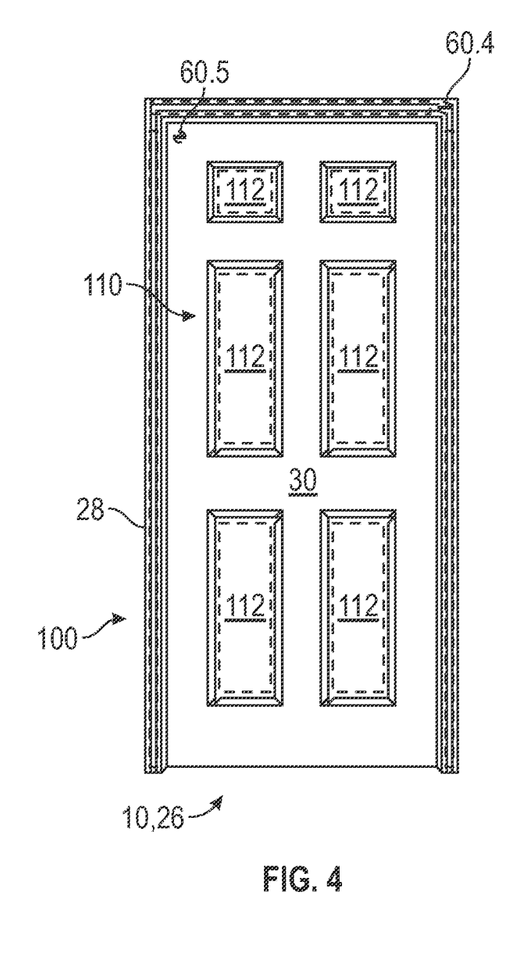
FIG. 4 shows an exterior side of the door shown in FIG. 3.

With reference now to FIGS. 3 and 4, the fenestration unit 10 is in the form of a single-hinged entry door unit 26. One skilled in the art should understand that the single-hinged entry door unit represents an exemplary embodiment and that the present disclosure contemplates other types of door units, including but not limited to double-hinged entry or sliding door units, adapted with a built-in power supply module and a power outlet module in a manner similar to that described herein. The single-hinged door unit 26 includes a door frame 28 hingedly supporting a door slab 30.

FIG. 3 shows the interior side of the door unit 26 having one or more power supply module 40.4, 40.5, built into a component for the door unit 26. For illustrative purposes, power supply module 40.4 is shown built into the door frame 28, power supply module 40.5 is shown built into the door slab 30. While multiple power supply modules are illustrated, one such unit may be sufficient for a given application. One skilled in the art should understand that a power supply module may built into other locations on the door unit 26. These power supply module 40.4, 40.5 (along with 40.1, 40.2, 40.3) may be singularly or collectively referenced herein as a power supply module 40.

FIG. 4 shows the exterior side of the door unit 26 having one or more power outlet modules 60 built into a component of the door unit 26. For illustrative purposes, power outlet module 60.4 is shown built into the door frame 28 and power outlet module 60.5 is shown built into the door slab 30. While multiple power outlet modules are illustrated, one such unit may be sufficient for a given application. One skilled in the art should understand that a power outlet module may built into other locations on the door unit 26. These power outlet modules 60.4, 60.5 (along with 60.1, 60.2, 60.3) may be singularly or collectively referenced herein as a power outlet module 60.

Figure 5:
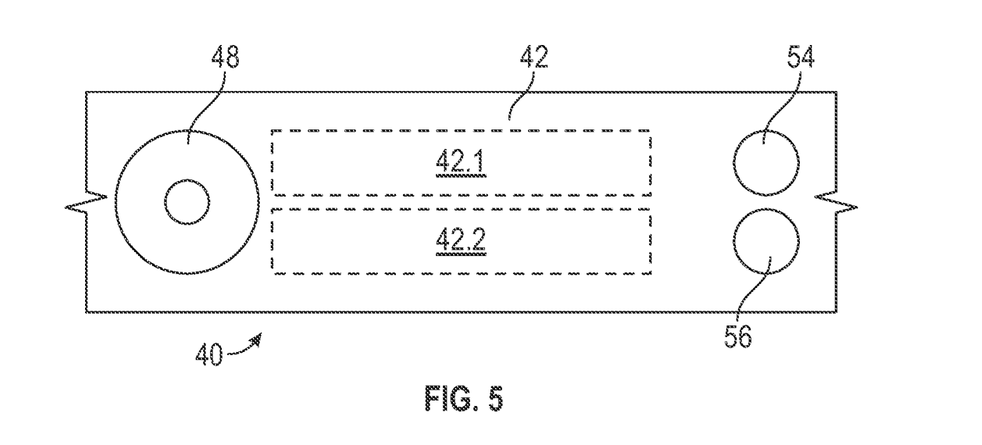
FIG. 5 shows a detail of an integral power supply module.
Figure 6:
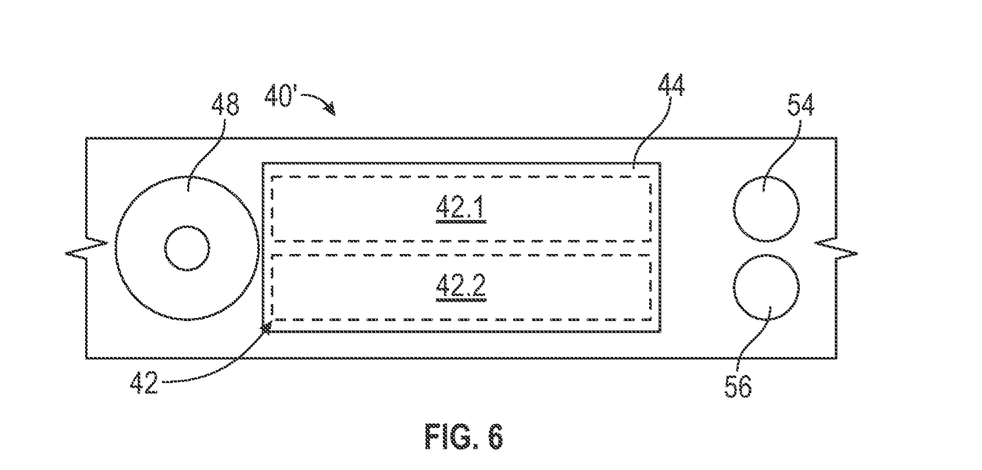
FIG. 6 shows a detail of an accessible power supply module.

With reference now FIG. 5, the power supply module 40 may include a battery pack 42 that is concealed within an interior volume of the fenestration unit 10 such that the battery pack 42 is not accessible once the fenestration unit 10 is installed in an opening (not shown). Alternately, as shown in FIG. 6, the power supply module 40' may include a battery pack 42 that is concealed within an interior volume of the fenestration unit 10, which is enclosed by a cover plate 44 that is releasably secured to the fenestration unit 10 to provide access to the battery pack 42 once installed in an opening (not shown). In one embodiment, the battery pack 42 includes one or more batteries 42.1, 42.2 that are rechargeable by a power source 46. The batteries 42.1, 42.2 may be any suitable type of rechargeable battery such as Alkaline, Ni—Cd, Li-ion, Ni-MH, Li-polymer or Zn—C for example. As best seen in FIGS. 5 and 6, the power supply module 40 may include a female power connector 48 for electrically coupling a power source 46 to the power supply module 40.

The power source 46 may be supplied from the electrical system in the building that the fenestration unit 10 is installed. The fenestration unit 10 may be hard-wired or externally coupled via a wall outlet to the electrical system. The power source 46 may be a solar panel array supported on the fenestration unit 10 as further detailed below. The power source 46 may also include a combined power supply from the electrical system and the solar panel array 100, 110, 120.

Figure 7:
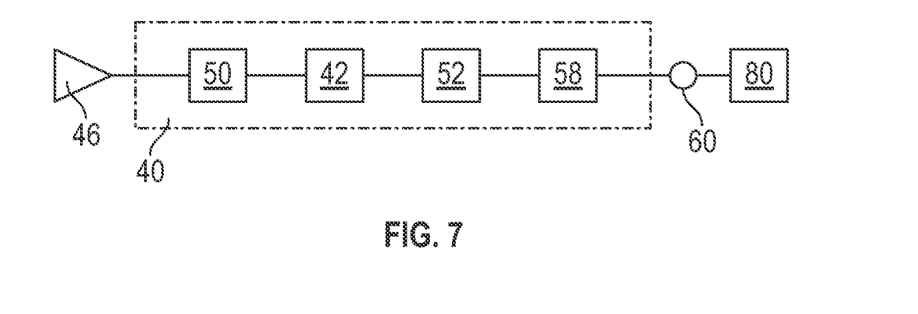
FIG. 7 shows a schematic circuit diagram of the integrated power interface and a homeower device.

With reference now to FIG. 7, the power supply module 40 may include an input-side power transformer 50 configured to convert and condition the input power from the power source 46 to match the charging power requirements for the battery pack 42. The power transformer 50 may be external of the fenestration unit 10 such as a power adapter or "wall wart" plugged into a wall outlet (not shown) for converting the input voltage from the power grid (e.g., 110 VAC in USA) to a suitable charging voltage (e.g., 1-10 VDC) for the battery pack 42. Alternately, the power transformer 50 may be internal of the fenestration unit 10 such as a power conditioning circuit 50 for converting the input voltage, whether from the power grid (e.g., 110 VAC in USA) or from a solar panel array (e.g., 12-24 VDC) to a suitable charging voltage (e.g., 1-10 VDC) for the battery pack 42.

The power supply module 40 may include a microprocessor 52 electrically coupled to the battery pack 42. The microprocessor 52 may be programmed for controlling various functions of the power supply module 40 including regulating the input voltage and output voltage within a proper operating range, detecting operating parameters of the power supply module 40 and providing status signaling to an indicator display 54 (see FIGS. 5 and 6) on the power supply module 40. The microprocessor 52 may also monitor an on-board sensor 56 in the fenestration unit 10. The sensor 56 may be configured to sense various environmental conditions around the fenestration unit 10 such as light, temperature or humidity. The microprocessor 52 may also be configured with wireless communication capabilities over various wireless networks (e.g., WLANS, WPANS, and/or WMANS as well as M2M, P2P or other distributed ledger technology). With such communication capabilities, the fenestration unit 10 may be configured as a component within a home automation network. The microprocessor 52 is configured to operate in a variety of network environments with various software interfaces including macOS, Windows, Linux, iOS, Android and similar standard operating systems.

Figure 8:
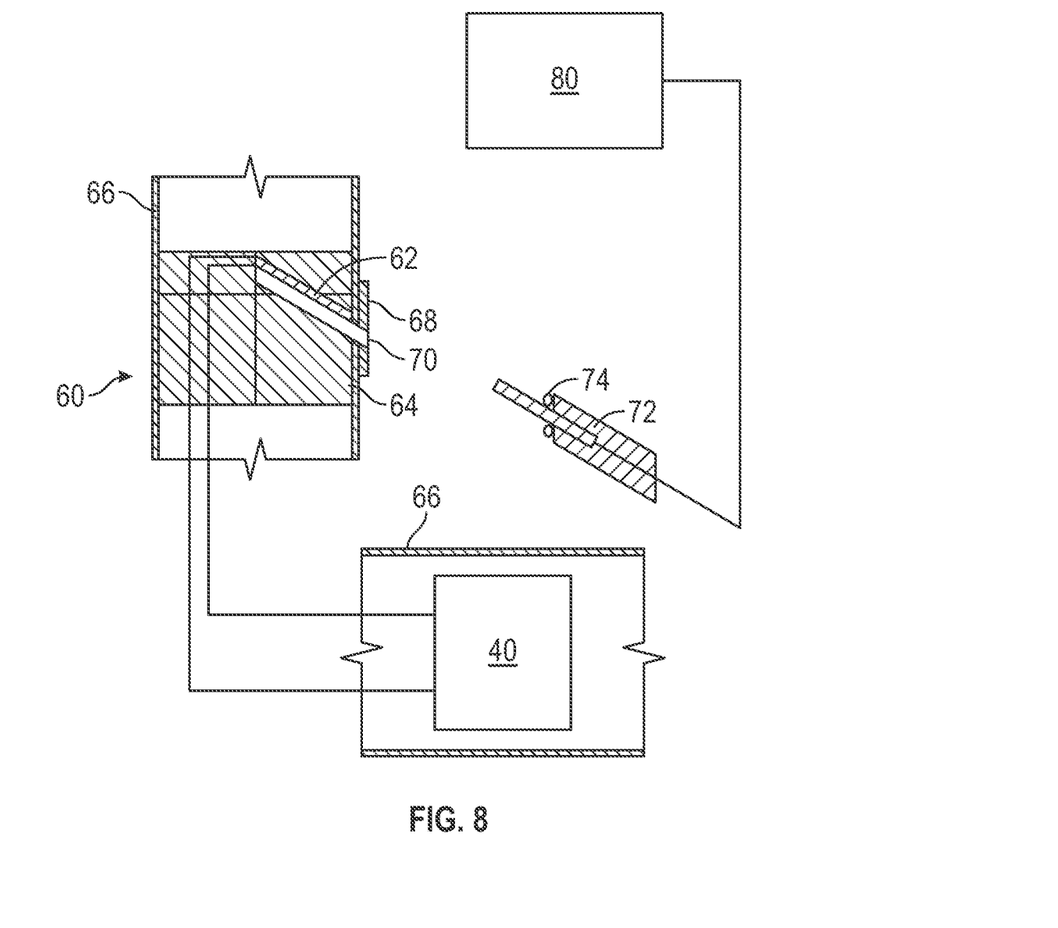
FIG. 8 shows a schematic cross-section showing the fenestration unit in accordance with the present disclosure.

The power supply module 40 may include an output-side power transformer 58 configured to convert and condition the power from the battery pack 42 to match the power requirements of the power outlet module 60. (e.g., at least 200 mAh, 5-20 VDC). As illustrated in FIGS. 7 and 8, the power supply module 40 is electrically coupled to a female output connector 62 in the power output module 60. Any suitable type of connector may be employed as the power output connector 62, for example USB-A, USB-B, USB-C, micro USB, Thunderbolt, 9v, HDMI, CAT-POE or other conventional connectors used with homeowner devices. While a single output connector 62 is illustrated in FIG. 8, one skilled in the art should appreciate that the power outlet module 60 may include one or more outlet connectors of the same or different configurations.

Figure 9:
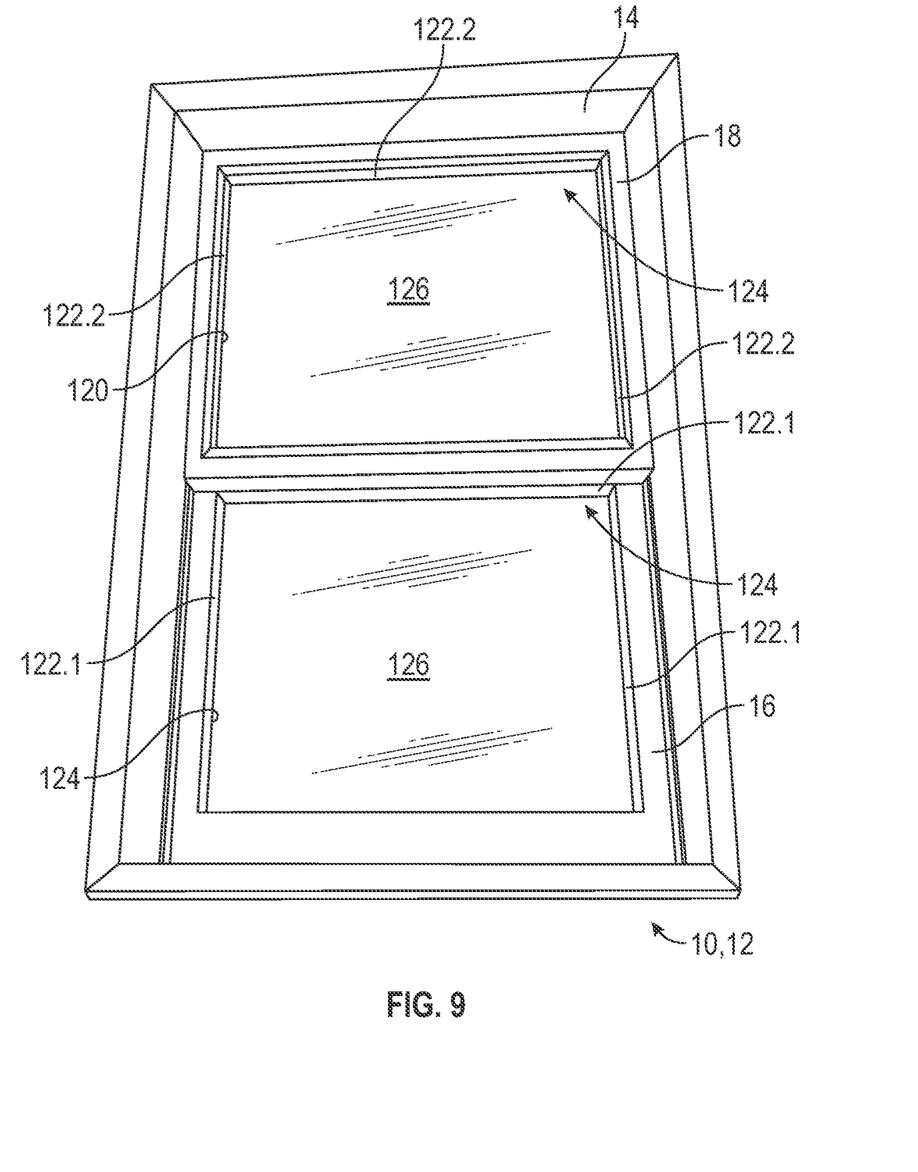
FIG. 9 shows an exterior side of a window having an insulated glass unit with photo-voltaic solar devices.

As mentioned above, the input power for the power supply module 40 may be a solar panel array configured in various means and supported on the fenestration unit 10. With reference to FIGS. 1-4, one embodiment of a solar panel array 100 includes a plurality of solar cell 102 supported on the frame 14, 28 of the fenestration unit 10. In another embodiment, a solar panel array 110 includes a plurality of translucent solar cells 112 (shown in broken lines) applied on the surface (e.g., glass panes or door panels) of the fenestration unit 10. FIG. 9 illustrates another embodiment in which a solar panel array 120 include a plurality of solar cell 122 supported on a spacer edge 124 of the insulated glass unit or IGU 126. In particular, a first solar array 120.1 includes a plurality of solar cells 122.1 (shaded region) disposed in the IGU 126 supported in the lower sash 16 and a second solar array 120.2 includes a plurality of solar cells 122.2 (shaded region) disposed in the IGU 126 supported in the upper sash 18. One skilled in the art should appreciate that a fenestration unit 10 may include one or more of these solar panel arrays, 100, 110, 120. Wiring (not shown) is disposed within the fenestration unit 10 and electrically couples the solar panel array(s) 100, 110, 120 to the power supply module 40.

reference now to FIG. 8, a power outlet module 60 configured for exterior exposure is further described. The power outlet module 60 includes a weatherproof housing 64 disposed within a structural component 66 of the fenestration unit 10. The structural component may be a frame 14, 28, a sash rail 22, 24 or a door slab 30. The female connector 62 is oriented in the housing 64 in an angularly downward direction a for providing natural draining of any water that may collect in the connector 62 For example, the angular orientation a may be in the range of 5-20°. The weatherproof housing 64 is configured to resist water intrusion from environmental condition caused by weather (e.g., drizzle, rain, snow, sleet, ice, etc.) or water spraying equipment (e.g., sprinklers, hoses, sprayers, etc.) The weatherproof housing 64 includes a flexible silicone grommet 68 disposed over the opening of the connector 62 to inhibit water or water vapor from entering the connector 62. An access slot 70 formed in the grommet 68 is positioned over the female connector 62 for allowing a complementary male connector 72 to be inserted into the female connector 62. The male connector 72 may include a seal 74 which engages the female connector 62 to inhibit water penetration into the power outlet module 60. Other means for weatherproofing include covers, seals, sockets, plugs, housings, and the like which may be implemented to provide a weatherproof housing 64 for the power outlet module 60. In one embodiment, the power outlet module 60 provides protection of the connector 62 from spraying or splashing of water (or other liquids) in all direction such that its level of resistance to water ingress is rated at IPX4 or higher under the Ingress Protection standard. A homeowner device 80 is coupled to the power supply module 40 via the power outlet module 60 when the male connector 72 is inserted into the female connector.

From the foregoing detail description it is apparent that the present disclosure provides a fenestration unit (e.g., window and/or door units) with built-in battery and input/output ports for powering homeowner devices that include but are not limited to security cameras, flood lights, sensors inside or outside of home, and other devices of homeowner's needs. The fenestration unit may include a battery pack that can be charged with home power outlet (e.g., ~110V in USA and ~220V in China), built-in transparent photovoltaic glasses (e.g., perovskite solar cell; organic solar cells), or other types of solar cell integrated into the fenestration unit (e.g., solar cell that are put onto the spacer).

The battery capacity may be customized to desired applications and are hid inside the frame of the fenestration unit. Battery management components are provided to control the charging and discharging of the battery at optimal conditions regardless of temperature. The weatherproofing of battery component inside the fenestration unit may be provided with the use of conformal coating, which can be apply using different application methods including spray coating, dip coating, brush coating and etc. The composition of the conformal coating can be a single use or combined use of acrylics, silicones, urethanes, perylenes and other suitable polymerics that prevent moisture, dust, temperature extremes and chemicals from damaging the performance and lifetime of the electrical components The electrical components are waterproofed to a rating of IPX4 for providing durability upon contact with water or water vapor.

The input/output ports can be one or more in numbers and can be fabricated at different location on the fenestration unit. The input/output port may be tilted to provide channels for water drainage if there is a water built-up inside the port. Moreover, the ports can be covered with silicone cap when not in use and can be covered with silicone connectors when plugged-in with homeowner devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A fenestration unit for a dwelling comprising:
   a frame supporting a movable panel;
   a power supply module including a battery pack disposed in one of the frame and the moveable panel; and
   a power outlet module mounted in an exterior surface of at least one of the frame and or the movable panel, the power outlet module having a weatherproof housing supporting a power outlet connector electrically coupled to the battery pack, wherein the weatherproof housing includes a flexible grommet disposed on the exterior surface over the power outlet connector and providing a weather resistance rating of at least IPX4, the flexible grommet having an access slot formed therethrough to allow a complementary power connector to be inserted through the flexible grommet and into the power outlet connector.

2. The fenestration unit of claim 1, wherein the weatherproof housing supports the power outlet connector in an angularly downward orientation.

3. The fenestration unit of claim 1, wherein the power supply module comprises a rechargeable battery pack.

4. The fenestration unit of claim 3, further comprising a power source operable coupled to the rechargeable battery pack.

5. The fenestration unit of claim 3, further comprising a power transformer operable coupled between the power source and the rechargeable battery pack for converting power from the power supply to power suitable for charging the battery pack.

6. The fenestration unit of claim 5, wherein the power source comprises an electrical system powering the dwelling and the power transformer is operable to convert power from the electrical system to power for recharging the battery pack.

7. The fenestration unit of claim 5, wherein the power source comprises a solar panel array supported on the fenestration unit and the power transformer is operable to convert power from the solar panel array to power for recharging the battery pack.

8. The fenestration unit of claim 7, wherein the solar panel array comprises a plurality of solar cells supported on the frame of the fenestration unit.

9. The fenestration unit of claim 7, wherein the solar panel array comprises a plurality of solar cells supported on the movable panel of the fenestration unit.

10. The fenestration unit of claim 7, wherein the power source further comprises an electrical system powering the dwelling and the power transformer is operable to convert power from the electrical system to power for recharging the battery pack.

11. The fenestration unit of claim 3, further comprising a power conditioning circuit operably coupled between the battery pack and the power outlet module for converting power from the battery pack to power suitable for a homeowner device configured to be connected to the power outlet connector.

12. The fenestration unit of claim 3 further comprising a microprocessor operable coupled to the battery pack and configured to regulate at least one of an input voltage to the battery pack and an output voltage from the battery pack.

13. The fenestration unit of claim 12, further comprising a status indicator, wherein the microprocessor is configured to monitor a state of at least one of the power supply module and the power outlet module and to communicate the state to the status indicator.

14. The fenestration unit of claim 12, further comprising a sensor for measuring an environmental parameter, wherein the microprocessor is configured to monitor the sensor and provide generate a signal representing the environmental parameter.

15. The fenestration unit of claim 12, wherein the microprocessor is configured for wireless communication with a wireless network accessible to the fenestration unit.

16. The fenestration unit of claim 1, wherein the fenestration unit comprises a window unit.

17. The fenestration unit of claim 1, wherein the fenestration unit comprises a door unit.

* * * * *